United States Patent [19]

Hastings-James et al.

[11] 4,251,689
[45] Feb. 17, 1981

[54] LOUDSPEAKER TELEPHONE APPARATUS

[75] Inventors: Richard Hastings-James, Halifax; George W. Holbrook, Tantallon, both of Canada

[73] Assignee: Canadian Patents & Dev. Ltd., Ottawa, Canada

[21] Appl. No.: 55,791

[22] Filed: Jul. 9, 1979

[51] Int. Cl.³ .............................................. H04M 9/08
[52] U.S. Cl. .................................. 179/1 HF; 179/81 B
[58] Field of Search .............. 179/81 A, 81 B, 1 HF, 179/1 VC, 170 R, 170 D

[56] References Cited

U.S. PATENT DOCUMENTS

| 2,913,524 | 11/1959 | Montgomery | 179/1 HF |
| 4,002,860 | 1/1977 | Terai et al. | 179/1 HF |

Primary Examiner—Daryl W. Cook
Assistant Examiner—Joseph A. Popek
Attorney, Agent, or Firm—Edward Rymek

[57] ABSTRACT

The loudspeaker telephone apparatus consists of a hybrid circuit which interconnects a telephone line and its line balance impedance with receive and transmit amplifiers. These amplifiers are connected to a bridge circuit, the arms of which are formed from two pairs of similar coil groups located in two multi-filar moving coil loudspeakers. The coil groups in one loudspeaker are connected in series aiding while the coil groups in the other loudspeaker are connected in series bucking. In one arrangement, the bridge circuit may be connected directly to the amplifier, the receive amplifier being connected across the pair of coils in each loudspeaker and the transmit amplifier being connected across the junction between the pair of coils in each loudspeaker. In another arrangement, a second hybrid circuit is used to connect the bridge to the amplifiers which are connected to the hybrid by its amplifier terminals. One coil group in the bridge is connected to the line terminals of the hybrid and a balance RC impedance is connected to the balance terminals.

5 Claims, 3 Drawing Figures

LOUDSPEAKER TELEPHONE APPARATUS

BACKGROUND OF THE INVENTION

This invention is directed to loudspeaker systems and in particular to loudspeaker systems for use as a loudspeaker telephone terminal.

Telephone apparatus is normally designed to acoustically isolate the microphone from the loudspeaker to assure the prevention of sing-around paths. However, it has become desirable to operate the telephone in a hands-off manner so that other tasks may be performed while talking over the telephone, and more essentially so that one or more groups of people may talk and listen at various locations in the form of a conference.

Loudspeaker telephone apparatus which has been developed to allow hands-free operation, operates on the basis that at each location, the apparatus is voice-switched such that when a person speaks into the microphone, at one location, a switch operates to disconnect the speaker at that location. This type of system operates quite satisfactorily for a conversation between two people at two locations, however, as the number of telephone locations in a conversation or telephone conference increases, the chances of two people speaking at the same time increases. To avoid this situation in which two or more loudspeakers are off at the same time, the conference must become very formal with the interplay of participants being controlled by a chairman.

SUMMARY OF THE INVENTION

It is therefore an object of the present invention to provide a loudspeaker telephone apparatus wherein loudspeakers are used as bidirectional receive and transmit transducers.

It is a further object of the present invention to provide loudspeaker telephone apparatus wherein the receive and transmit transducers are not acoustically isolated from one another.

These and other objects are achieved in loudspeaker telephone apparatus including a hybrid circuit having line terminals for connecting the telephone apparatus to a two-wire telephone line, balance terminals and first and second amplifier terminals. A line balance impedance is connected to the hybrid balance terminal for balancing the impedance of the telephone line. The apparatus further includes a receive amplifier having an output, and an input connected to the hybrid first amplifier terminals, and a transmit amplifier having an input, and an output connected to the hybrid second amplifier terminals. A pair of similar electro-acoustic loudspeakers, each having two similar coil groups formed from coils having substantially identical resistance, inductance and mutual inductance, are connected to form a bridge circuit. The coil groups in the first loudspeaker are connected in series-aiding and the coil groups in the second loudspeaker are connected in series-bucking. The bridge circuit is connected to the output of the receive amplifier and the input of the transmit amplifier such that the loudspeakers convert received electrical signals to acoustic signals and acoustic signals to transmitted electrical signals.

In one embodiment, the output of the receive amplifier is connected across the two coil groups of each of the first and the second loudspeakers and, the input of the transmit amplifier is connected between the coil groups of each of the first and second loudspeakers.

In a second embodiment, the apparatus includes a feedback amplifier having its output connected across the two coil groups of each of the first and second loudspeakers and its input connected between the coil groups of each of the first and second loudspeakers. This apparatus may further include a second hybrid circuit having line terminals, balance terminals and first and second amplifier terminals connected respectively to the output of the receive amplifier and the input of the transmit amplifier. The second hybrid line terminals are connected across one coil group in the bridge circuit, and balance terminals are connected to a balance circuit to balance the effective impedance of the one coil group.

Other objects and aspects of the invention will be clear from the detailed description of the drawings.

DESCRIPTION OF THE PREFERRED EMBODIMENTS

Figure 1:
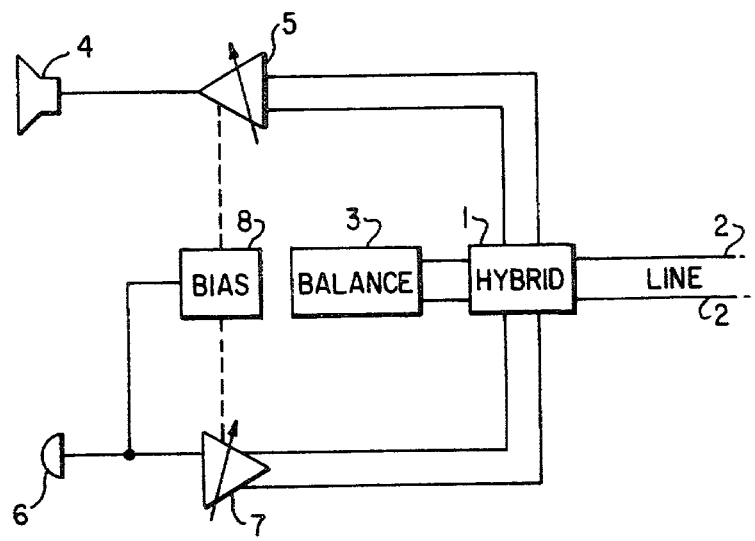
FIG. 1 illustrates the prior art voice-switched loudspeaker telephone apparatus.

FIG. 1 illustrates a conventional voice-switched loudspeaker telephone. A hybrid coil circuit 1 is used to connect the telephone to a two wire line 2. Hybrid 1 has line terminals to which line 2 is connected, and balance terminals to which a line balance impedance 3 is connected. Hybrid 1 also has two further sets of terminals for connection to a receive amplifier and a transmit amplifier. The hybrid 1 is used to isolate the incoming signals from the outgoing signals. Typical hybrid circuits are described in the Electronics Engineers Handbook—McGraw-Hill Book Company, 1975, Section 22-32, which is incorporated herein by reference. A loudspeaker 4 is connected to the hybrid 1 through a variable gain receive amplifier 5. A microphone 6 is also connected to the hybrid 1 through a variable gain transmit amplifier 7. Finally, a bias circuit 8 for amplifiers 5 and 7 is connected to microphone 6 and is controlled by the voice signal from the microphone 6.

The transmit amplifier 7 and the receive amplifier 5 require a total gain that is in excess of the transhybrid loss provided by the line balance 3. Under normal conditions, the gain of the receive amplifier 5 is at a maximum value and that of the transmit amplifier 7 at a minimum value. Under quiescent conditions speech entering the microphone circuit will switch the receive amplifier 5 to its "off" condition and the transmit amplifier 7 to its "on" condition. The set is thus voice-switched from the receive condition to the transmit condition, and under these circumstances, it is assumed that all other sets connected into the system will remain at the receive condition. When the voice signal stops, the receive amplifier 5 will return to maximum gain or "on" and the transmit amplifier 7 will return to minimum gain or "off".

Figure 2:
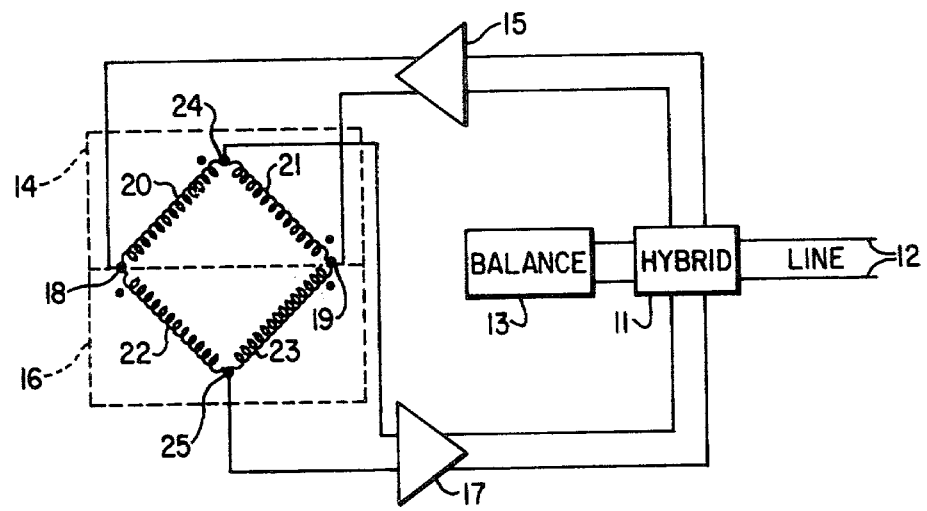
FIG. 2 illustrates one embodiment of loudspeaker telephone apparatus in accordance with the present invention.

One embodiment of loudspeaker telephone apparatus in accordance with the present invention is shown in FIG. 2. The apparatus includes a hybrid circuit 11 of the type described with regard to FIG. 1, to connect the apparatus to a two wire line 12. A balance impedance 13 is connected to the hybrid 11 to balance the impedance of the two wire line. The hybrid is further connected to a receive amplifier 15 and a transmit amplifier 17. The receive amplifier is connected across two multi-filar moving coil loudspeakers 14 and 16 at terminals 18 and 19.

The multi-filar moving coil loudspeakers are of the type described in a co-pending United States Patent Application entitled, "Multi-filar Moving Coil Loudspeaker" filed on even date with the present application to Richard Hastings-James and George W. Holbrook, which application is incorporated herein by reference. Loudspeakers 14 and 16 each have similar coil groups 20,21 and 22,23 respectively, each group being made up of coils having near identical resistance, inductance and mutual inductance as they all cut the same magnetic flux lines. Coil groups 20 and 21 are connected together at junction 24 in series-aiding between terminals 18–19, whereas coil groups 22 and 23 are connected together at junction 25 in series-bucking between terminals 18–19. Since all of the coil groups 20, 21, 22 and 23 are similar, speaker 16 will act as a resistance, but speaker 14 will provide the acoustic output. In addition, since the four coil groups are similar, essentially none of the signal output from receive amplifier 15 appears across junctions 24–25. In this manner, junctions 24 and 25 are isolated from the input and a sing-around path is prevented. When an acoustic wave impinges on the loudspeakers 14 and 16, as when a person speaks, an electrical signal is generated in each coil group, however since coil groups 20 and 22 are connected in series-aiding across junctions 24–25, they generate a signal between these junctions. Coil groups 21 and 23 are connected in series-bucking and therefore do not contribute to the output signal. The transmit amplifier 17 is connected across junctions 24–25, amplifies the output signal and applies it to the two-wire line 12 via hybrid 11.

As stated above, signals applied to terminals 18–19 are severely attenuated across junctions 24–25. This attenuation has been found to be greater than 70 dB over the telephone speech band of 200–3200 hz. As connected in FIG. 2, the groups of windings of the two multi-filar speakers 14 and 16 act as a highly balanced hybrid circuit. The two-wire line 12 is connected via a hybrid circuit 11 to the receive amplifier 15 and transmit amplifier 17. The nominal balance of the hybrid 11 is obtained by a line balance 13 and a transhybrid loss of 10 dB can be achieved. The transhybrid loss of the two speakers 14 and 16 is, however, greater than 70 dB and, consequently, the gains of amplifiers 15 and 17 can be increased to a total of slightly less than 80 dB. By adjusting the amplifier gains to the correct level, good loudspeaker reception is obtained with a signal of −10 dB incoming on the line 12 and an output on the line 12 of 1 mW which is obtained with normal speech spoken into the loudspeaker.

Figure 3:
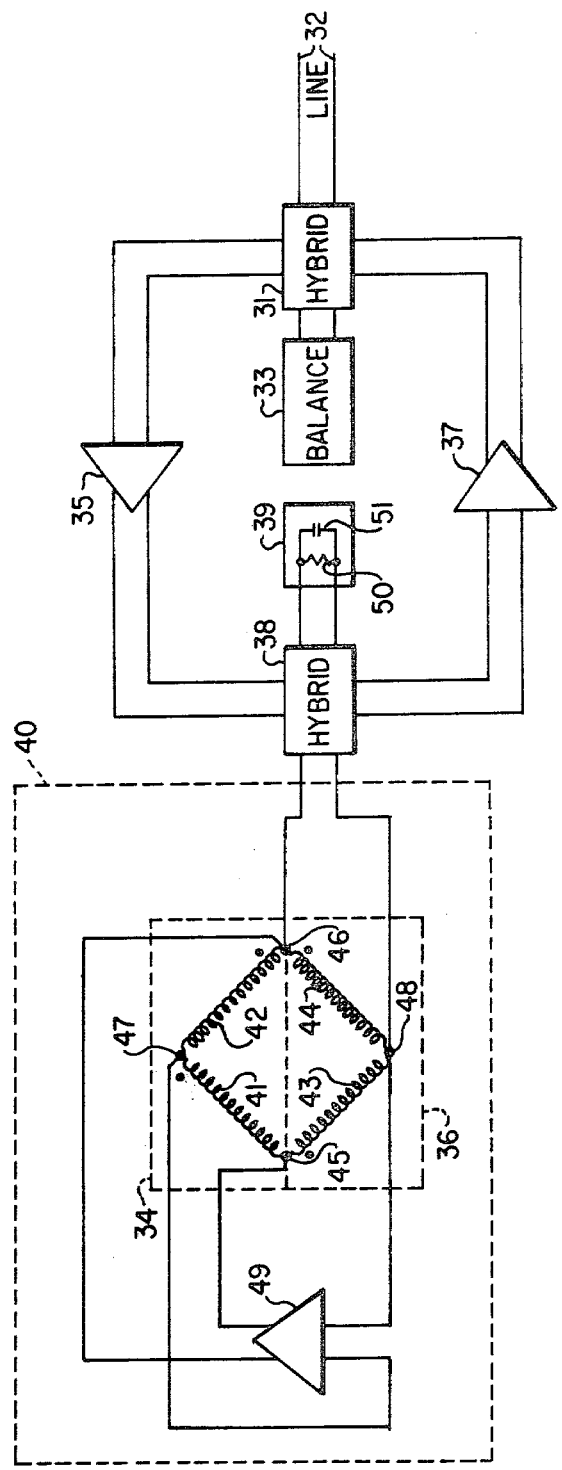
FIG. 3 illustrates a second embodiment of loudspeaker telephone apparatus in accordance with the present invention.

FIG. 3 illustrates another embodiment of loudspeaker telephone apparatus in accordance with the present invention. As in FIG. 2, the terminal includes a hybrid circuit 31 to which the two wire line 32 is connected and is balanced by a line balance impedance 33. In addition, a receive amplifier 35 and a transmit amplifier 37 are connected to the hybrid 31. However, in this embodiment, the amplifiers 35 and 37 are connected to a second hybrid circuit 38. A highly efficient multi-filar moving coil loudspeaker circuit 40 is connected into the hybrid 38 and is balanced by a balance 39. The efficient loudspeaker circuit 40 may be of the type described in the co-pending patent application referred to above, however, the feedback circuit 40 described with regard to FIG. 3 is preferred.

The circuit 40 includes two similar multi-filar loudspeakers 34 and 36 which each have two similar coil groups 41, 42 and 43, 44, respectively, as described with reference to FIG. 2. The coil groups are connected in a bridge arrangement such that coil groups 41 and 42 in speaker 34 are connected at junction 47 in series-aiding across terminals 45–46, and coil groups 43 and 44 in speaker 36 are connected at junction 48 in series-bucking across terminals 45–46. The four coil groups 41, 42, 43, and 44 thus form a highly balanced bridge circuit and signals impressed across terminals 45–46 will produce only a small signal across junctions 47–48. It has been found that the ratio of these signals is greater than 70 dB. To improve the efficiency of the loudspeakers 34 and 36, a feedback amplifier 49 is used with its input connected across junctions 47–48 and its output connected across terminals 45–46. Since the ratio of the signals between terminals 45–46 and junctions 47–48 is greater than 100:1, the gain of the amplifier 49 may be adjusted to this level which increases the effective impedance of each winding group by that amount without affecting the stability of the circuit. If the nominal impedance of each winding group is in the order of 2 ohms, the effective impedance of each group will be in the order of 200 ohms. This increase in impedance directly increases the apparent efficiency of the loudspeakers 34 and 36 as seen by hybrid 38 when acting as a loudspeaker or as a microphone.

To connect the loudspeakers into the telephone terminal, hybrid 38 is connected across coil group 44 and the impedance of the coil group 44 is balanced by a balance impedance 39 which may consist of a simple resistance 50 and capacitance 51. A transhybrid loss of over 30 dB over the speech band can be obtained in hybrid 38 and therefore the gains of receive amplifier 35 and transmit amplifier 37 can be set at 40 dB. The increase of impedance between terminal 46 and junction 48 by a factor of 100 represents a gain of 20 dB in each direction. Therefore, there is an effective loop gain of 80 dB and adequate speech in both directions is obtained.

Modifications to the above described embodiments of the invention can be carried out without departing from the scope thereof and therefore the scope of the present invention is intended to be limited only by the appended claims.

We claim:
1. A loudspeaker telephone apparatus comprising:
hybrid circuit means having line terminals for connecting the telephone apparatus to a telephone line, balance terminal, and first and second amplifier terminals;
line balance means connected to the hybrid balance terminals for balancing the impedance of the telephone line;
receive amplifier means having output means and input means connected to the hybrid first amplifier terminals;
transmit amplifier means having input means, and output means connected to the hybrid second amplifier terminals;
a pair of similar electro-acoustic loudspeaker means, each of said loudspeaker means having two similar coil groups formed from coils having substantially identical resistance, inductance and mutual inductance, the coil groups in the speaker means being connected as arms in a bridge circuit such that the coil groups in the first loudspeaker means are connected in series-aiding and the coil groups in the second loudspeaker means are connected in series-bucking; and means for connecting the bridge circuit to the output means of the receive amplifier and the input means of the transmit amplifier such that the loudspeaker means converts received electrical signals to acoustic signals and acoustic signals to transmitted electrical signals.

2. A loudspeaker telephone terminal as claimed in claim 1 wherein the connecting means comprises:
first means for connecting the output means of the receive amplifier across the two coil groups of each of the first and second loudspeaker means; and
second means for connecting the input means of the transmit amplifier between the coil groups of each of the first and second loudspeaker means.

3. A loudspeaker telephone apparatus comprising:
hybrid circuit means having line terminals for connecting the telephone apparatus to a telephone line, balance terminal, and first and second amplifier terminals;
line balance means connected to the hybrid balance terminals for balancing the impedance of the telephone line;
receive amplifier means having output means and input means connected to the hybrid first amplifier terminals;
transmit amplifier means having input means and output means connected to the hybrid second amplifier terminals;
a pair of similar electro-acoustic loudspeaker means, each of said loudspeaker means having two similar coil groups formed from coils having substantially identical resistance, inductance and mutual inductance, the coil groups in the speaker means being connected as arms in a bridge circuit such that the coil groups in the first loudspeaker means are connected in series-aiding and the coil groups in the second loudspeaker means are connected in series-bucking;
means for connecting the bridge circuit to the output means of the receive amplifier and the input means of the transmit amplifier such that the loudspeaker means converts received electrical signals to acoustic signals and acoustic signals to transmitted electrical signals; and
feedback amplifier means having an input means and an output means, the output means being connected across the two coil groups of each of the first and second loudspeaker means, and the input means being connected between the coil groups of each of the first and second loudspeaker means.

4. A loudspeaker telephone terminal as claimed in claims 1 or 3 wherein the connecting means comprises:
second hybrid circuit means having line terminals, balance terminals, and first and second amplifier terminals connected respectively to the output means of the receive amplifier means and the input means of the transmit amplifier means, second hybrid line terminals being connected across one coil group in the bridge circuit, and balance terminals being connected to a balance circuit to balance the effective impedance of the one coil group.

5. Loudspeaker telephone apparatus for connection to a telephone line comprising:
a pair of similar electro-acoustic loudspeaker means, each of said loudspeaker means having two similar coil groups formed from coils having substantially identical resistance, inductance and mutual inductance, the coil groups in the speaker means being connected as arms in a bridge circuit such that the coil groups in the first loudspeaker means are connected in series-aiding and the coil groups in the second loudspeaker means are connected in series-bucking;
means for connecting one of the coil groups in the second loudspeaker means to the telephone line; and
feedback amplifier means having an input means and an output means, the output means being connected across the two coil groups of each of the first and second loudspeaker means, and the input means being connected between the coil groups of each of the first and second loudspeaker means.

* * * * *